US007653069B2

(12) United States Patent
Lakshmanamurthy et al.

(10) Patent No.: US 7,653,069 B2
(45) Date of Patent: Jan. 26, 2010

(54) TWO STAGE QUEUE ARBITRATION

(75) Inventors: Sridhar Lakshmanamurthy, Sunnyvale, CA (US); Hugh Wilkinson, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 11/322,993

(22) Filed: Dec. 30, 2005

(65) Prior Publication Data
US 2007/0153803 A1 Jul. 5, 2007

(51) Int. Cl.
*H04L 12/28* (2006.01)
*H04L 12/50* (2006.01)
(52) U.S. Cl. ................. 370/395.4; 370/388; 370/412
(58) Field of Classification Search ........... 370/400, 370/419, 388, 386, 229, 230, 235, 395.1, 370/395.21, 395.4, 395.42, 468, 410, 412, 370/415, 428, 429
See application file for complete search history.

(56) References Cited

U.S. PATENT DOCUMENTS

| 6,859,438 | B2 * | 2/2005 | Haddock et al. | 370/235 |
| 7,304,944 | B2 * | 12/2007 | Bitar et al. | 370/229 |
| 7,346,068 | B1 * | 3/2008 | Dan et al. | 370/413 |
| 7,362,749 | B2 * | 4/2008 | Bishard | 370/357 |

* cited by examiner

*Primary Examiner*—Hanh Nguyen
(74) *Attorney, Agent, or Firm*—Blakely, Sokoloff, Taylor & Zafman LLP

(57) ABSTRACT

In a node to forward data on a switch fabric, a method that includes scheduling the forwarding of data associated with one of a plurality of traffic classes. The data is to be transmitted through one of a plurality of ports coupled to the switch fabric, each port to be associated with a queue to store data to be forwarded from that port. The scheduling is to include a two stage arbitration scheme. The first stage is to select one queue associated for each traffic class. The second stage is to select one queue from among the queues selected for each traffic class selected in the first stage.

23 Claims, 5 Drawing Sheets

TWO STAGE QUEUE ARBITRATION

BACKGROUND

Many networking, communications, and telecommunications systems typically require highly-reliable, high-speed, low-latency connectivity among networks of devices that are interconnected through switch fabrics or other types of communication links. Typically, because of the specific features of the applications used in these systems, these systems need to differentiate and prioritize the types of data transported in these networks. For example, video applications may require a higher priority. Otherwise, data packets containing video and audio may be received in such a way that the receiver of the video application experiences video images that are choppy or the audio portion is out-of-sync with the video portion. This may occur in instances when data traffic on a network is high and congestion results at one or more interconnected devices of a network. As a result, without differentiation, video data has a greater chance of being delayed or lost due to congestion in the network.

Interconnected devices may contain various ingress/egress buffers or queues to possibly minimize these effects of congestion in a network. Interconnected devices may also implement flow control measures that indicate congestion at particular points in the network and notify other interconnected devices to stop or slow down the rate at which data is forwarded. This may further avoid the effects of congestion since it slows down the rate of data such that a queue does not reach its storage capacity and eventually has to drop portions of data or data packets.

Typically, implementing flow control techniques in high speed networks may result in the need for flow control techniques that respond to congestion within a very small time interval (low-latency). Generally, this has lead to the use of expensive, application-specific mechanisms, based on proprietary communication links or interconnects to meet low-latency responses. Additionally, typical software used with low-cost, general-purpose mechanisms may have an unacceptably high latency that may not meet tight timing constraints when this software implements flow control. Thus to meet low latency requirements, application-specific, inter-device wiring may be needed. This may be problematic to implementing low-cost and reliable systems that are designed or operated according to various industry standards that encourage general-purpose, modular systems using non-proprietary solutions. One such industry standard is the PCI Industrial Computer Manufacturers Group (PICMG), Advanced Telecommunications Computing Architecture (ATCA) Base Specification, PICMG 3.0 Rev. 1.0, published Dec. 30, 2002, or later versions of the specification ("the ATCA standard"). Another industry standard is the Advanced Switching Interconnect Core Architecture Specification, Rev. 1.1, published November 2004, or later version of the specification ("the ASI standard").

DETAILED DESCRIPTION

As mentioned in the background, a software implemented flow control may not meet tight timing needs to respond to network congestion when used with low-cost, general-purpose mechanisms. In one example, the delay or high latency in implementing a software-based flow control leads to a hardware implemented flow control, e.g., within a node on a communication link or switch fabric with little or no software intervention. This hardware implementation likely meets the low-cost, general-purpose/modular objectives of some industry standards and also meets the tight timing constraints required for most networking, communication and telecommunication systems. The hardware implementation may also minimizes the effects of congestion.

In one example, a node is to forward data associated with one of a plurality of traffic classes on a switch fabric. Within this node, a method is implemented to schedule the forwarding of the data. The data is to be transmitted through one of the plurality of ports coupled to the switch fabric. In this example, each port is associated with a queue to at least temporarily store data to be forwarded from that port. The scheduling includes a two stage arbitration scheme. The first stage includes selecting one queue for each of the plurality of traffic classes. The second stage includes selecting a queue associated with a given port from among the queues selected for each traffic class selected in the first stage. This scheduling, in one example, is a way to implement fine grained congestion control for data forwarded from the node on the switch fabric.

Figure 1:
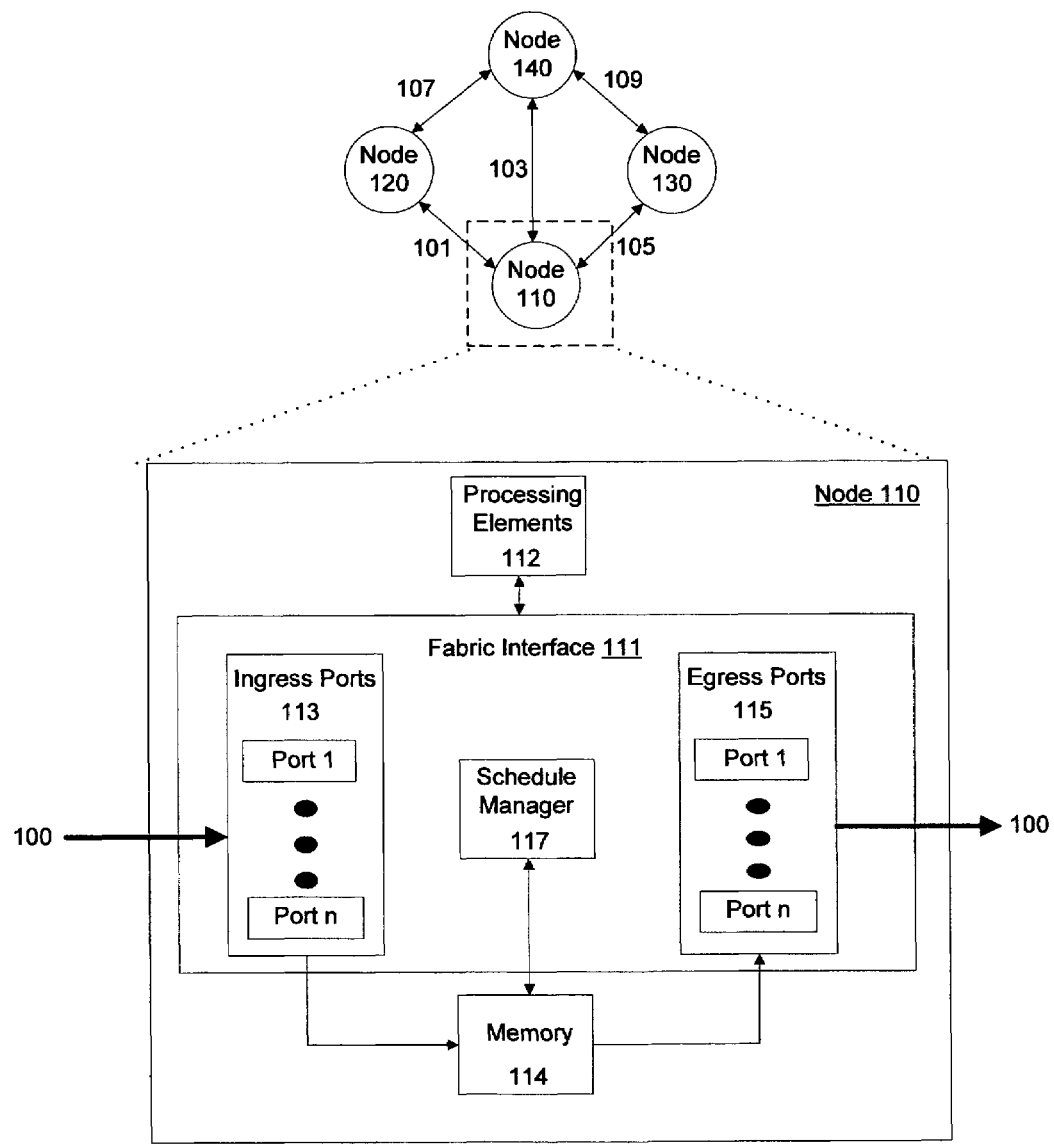
FIG. 1 is an illustration of elements of an example switch fabric to include an expanded view of a node.

FIG. 1 is an illustration of elements of an example switch fabric 100 to include an expanded view of node 110. As shown in FIG. 1, switch fabric 100 includes nodes 110, 120, 130 and 140 each coupled via communication links 101, 103, 105, 107 and 109 in a mesh topology. This disclosure is not limited to only mesh switch fabric topologies. For example, switch fabric 100 may also include one or more intermediate nodes (e.g., switch nodes) that make up other types of switch fabric topologies such as a star or dual-star topology.

In one example, nodes 110, 120, 130 and 140 are endpoint nodes on switch fabric 100 that couple to the end of switch fabric 100 and also couple to other nodes via one or more communication links (not shown) that are located within switch fabric 100 (e.g., a switch) or located remotely to switch fabric 100 (e.g., endpoints on another switch fabric). Thus, as described in this disclosure, when a node coupled to switch fabric 100 is to forward data on switch fabric 100 this may imply that data is to be forwarded to a node coupled to switch fabric 100 or a node coupled to a switch fabric remote to switch fabric 100. The data to be forwarded through one of a plurality of ports in the node coupled to switch fabric 100 (e.g., egress ports 115).

In one example, processing elements 112 include one or more processing elements to facilitate the processing and/or forwarding of data received by node 110. This may include one or more microprocessors, network processors, microcontrollers, field programmable gate arrays (FPGAs), application specific integrated circuit (ASICs), or executable content, to for example, provide services to or enable node 110 to perform lookups, access memory (e.g., memory 114), arbitrate limited node resources (e.g., port bandwidth), encode/decode data packets, encapsulate/unencapsulate data packets, etc.

In one implementation, as depicted in the blown up portion of FIG. 1, node 110 includes a fabric interface 111. Fabric interface 111 includes a plurality of ingress ports 113 and a plurality of egress ports 115 coupled to switch fabric 100. In one example, fabric interface 111 is a communication interface for processing elements 112 on node 110. Thus, fabric interface 111 enables processing elements 112 to receive or process or forward data over switch fabric 100.

In one example, fabric interface 111 is integrated within a processing element of processing elements 112. In another example, fabric interface 111 may be responsive to processing elements 112 in a separate logic that is included in a separate module. This separate module may include one or more of a microprocessor, network processor, microcontroller, FPGA, ASIC or executable content to implement a fabric interface 111 as described in this disclosure.

In one example, data associated with one or a plurality of traffic classes is received from switch fabric 100 through ingress ports 113 of node 110. These traffic classes may enable class of service differentiation for different types of data to be forwarded on switch fabric 100. For example, a given traffic class corresponds to a quality of service (QoS) commitment for types of data. A QoS commitment for data associated with a high priority traffic class may result in a guaranteed minimum throughput that requires that data to be processed or forwarded first compared to other data associated with lower priority traffic classes. In this example, the data may be temporarily stored in memory 114 (e.g., by processing elements 112).

In one example, memory 114 includes a plurality of queues, each queue associated with one or more ports among egress ports 115. These queues, for example, are used to temporarily store data associated with the plurality of traffic classes before the data is forwarded through one of the plurality of ports among egress ports 115. As described in more detail below, schedule manager 117 may schedule the data temporarily stored in these queues for forwarding or transmission through egress ports 115. The scheduling to include a two stage arbitration scheme.

Figure 2:
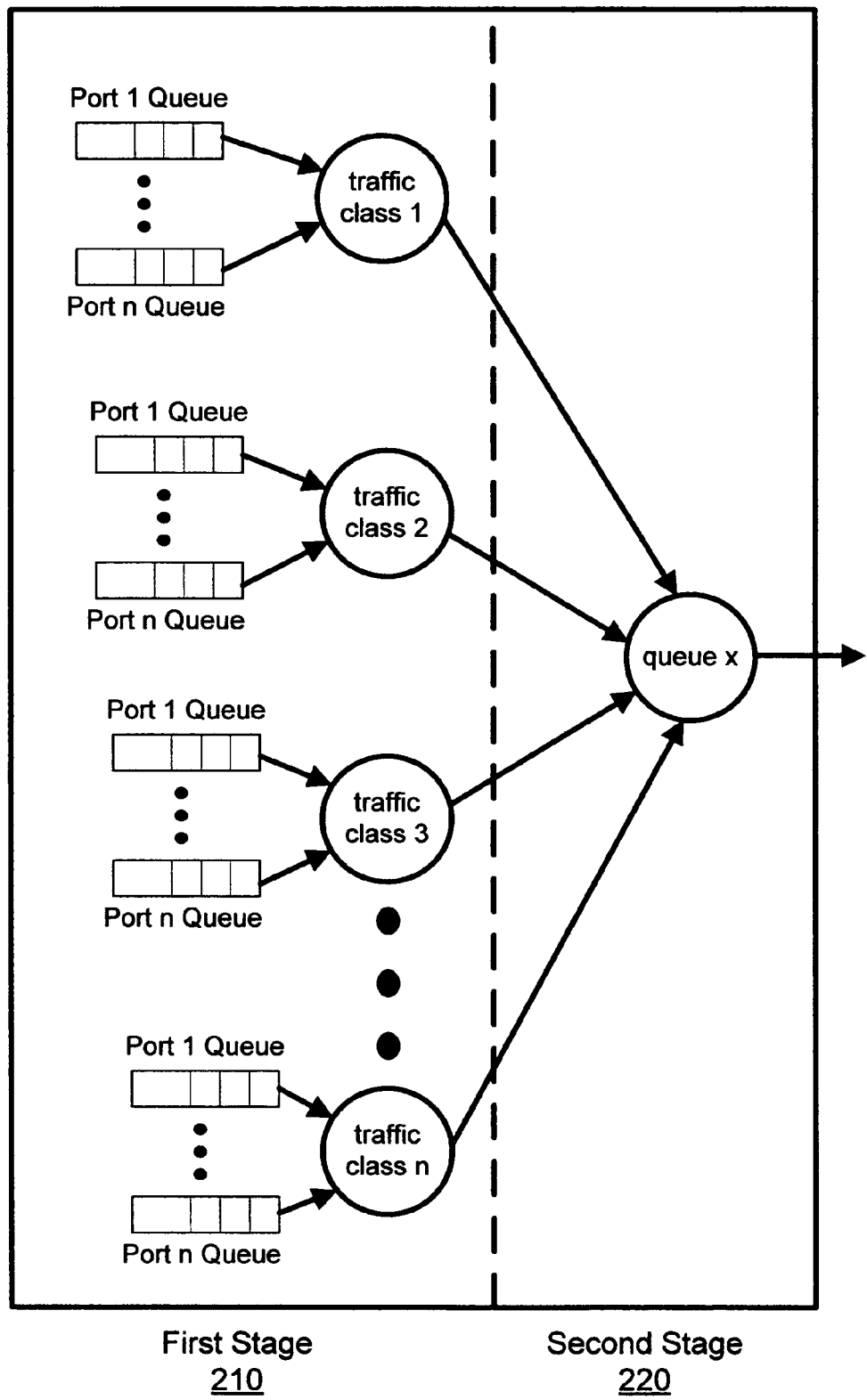
FIG. 2 is an illustration of an example two stage queue arbitration scheme.

FIG. 2 is an illustration of an example two stage arbitration scheme to schedule the forwarding of data associated with one of a plurality of traffic classes. As briefly mentioned above, this data may be temporarily stored in queues associated with each port of egress ports 115. These queues are depicted in FIG. 2 as port 1 queue through port n queue.

In one implementation, in first stage 210, a queue for each traffic class is selected. As shown in FIG. 2, the selection includes inputs for each queue associated with port 1 through port n to select one queue for each traffic class. These traffic classes are portrayed as a plurality of traffic classes 1, 2, 3 through any number of traffic classes n. In second stage 220, a selection is based on inputs for each queue selected for each traffic class in first stage 210. This selection to select one queue. This one queue selected in second stage 220 is portrayed as queue x in FIG. 2.

Figure 5:
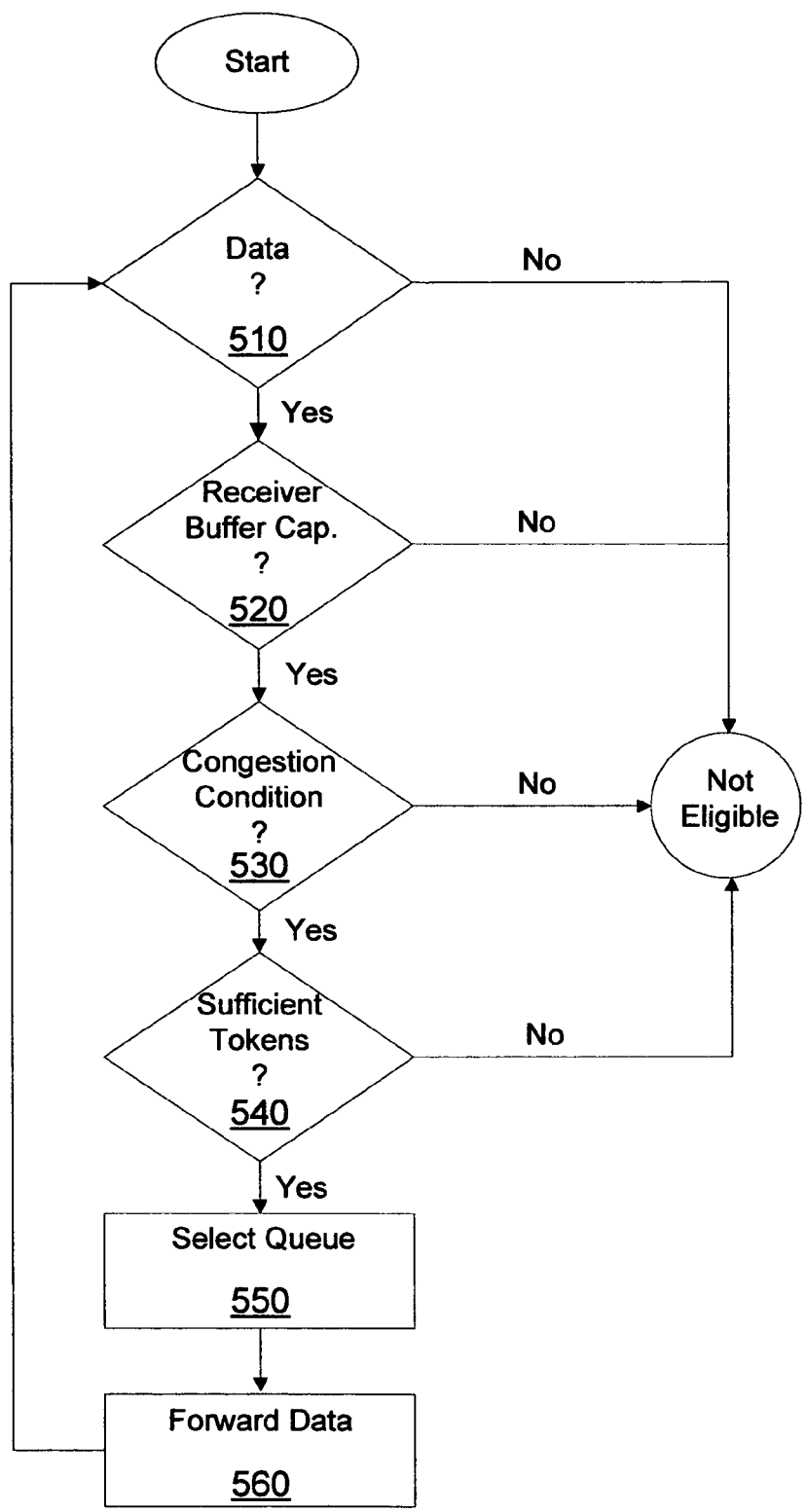
FIG. 5 is an example decision flow to select a queue.

In one example, as described in more detail when discussing FIG. 5, first stage 210 also includes one or more criterion to determine whether a queue is eligible for service. For example, these criterion are based, at least in part, on: whether the queue holds any data, an intended receiver of data (e.g., another node coupled to switch fabric 100) has indicated sufficient ingress queue or buffer capacity to receive the data, or there is no congestion condition existing at a given port associated with the queue. A given queue may also be eligible for service if the queue satisfies criteria to control the rate at which data is forwarded (i.e., packet flows) from a given port associated with the queue among egress ports 115. For example, a token bucket is one way to control packet flows from the queue to ensure that the port associated with the queue does not consume a disproportionate amount of bandwidth as compared to other ports.

In one implementation, both first stage 210 and second stage 220 use a same arbitration algorithm when selecting a queue. The inputs to the arbitration algorithms being at least one of the differences between the two stages. In other implementations, first stage 210 and second stage 220 include the use of different arbitration algorithms when selecting a queue. These algorithms may include, but are not limited to, weighted fair queue (WFQ), weighted round-robin (WRR) and round-robin (RR).

In one example, a WFQ arbitration algorithm is used in either stage of the arbitration scheme to select a given queue from among those eligible for service. This WFQ arbitration algorithm may include state inputs of: a specified rate to forward data from the queue (rate), last departure time from the queue (last_departure_time) and packet length of a data packet at the head of the queue (packet_length). The next departure time (next_departure_time) for a given queue may be calculated using an algorithm shown in table 1 below.

TABLE 1

If (current_time < last_departure_time) base_time = last_departure_time;
Else base_time = current_time;
Next_departure_time = base_time + rate * packet_length.

The next_departure_time calculation, in one example, is supported with a 16 bit multiplier that is used when implementing the calculation. Once the next_departure_time is calculated, the next_departure_times are sorted and the queue with the earliest next_departure_time is selected. Once the winning queue is selected, the next_departure_time for all of the losing or unselected queues are adjusted to account for the forwarding of the selected queue.

In one example, a WWR arbitration algorithm is used in either stage to select a given queue from among those eligible for service. This WWR arbitration algorithm includes a distribution of weights between the eligible queues. This distribution prevents a single queue with a large weight to use nearly all or a disproportionate amount of the transmit bandwidth for the egress ports of a node.

In one implementation, node 110 includes 5 queues associated with egress ports 115 that are eligible for service. Each of these eligible queues are assigned a relative weight (e.g., by schedule manager 117). In each selection round, each queue is given sufficient credits or scheduling slots by schedule manager 117 to transmit segments of the data held in the queue (e.g., data packets) equal to its relative weight. To ensure that a single queue does not get a disproportionate number of continuous scheduling slots, schedule manager 117 modulates between servicing eligible queues with a high relative weight and those with a lower relative weight. This modulation may be based on an adjustable user defined threshold vector (e.g., a slot threshold).

In one example, the 5 queues associated with egress ports 115 are identified as q0-q4. Schedule manager 117 assigns a weight distribution to q0-q4 of (10, 2, 1, 1, 1). A slot threshold, for example, is 2. Thus for a slot threshold of 2, schedule manager 117 will allocate the scheduling slots as—two slots for q0, followed by two slots of q1, two slots for q0 again, one slot for q2, two slots for q0, one slot for q3, two slots for q0, one slot for q4 and lastly two slots for q0. Expressed another way, the scheduling slots for data forwarded from egress ports 115 to switch fabric 100 appear in the following order—q0 q0 q1 q1 q0 q0 q2 q0 q0 q3 q0 q0 q4 q0 q0.

In this WRR implementation, the ports in egress ports 115 associated with q0-q4 receive their expected or targeted bandwidth as specified by their weights. However, the scheduling slots for the highest weighted queue (q0) is modulated among the slots for the other queues rather than a continuous scheduling slot. This ensures that q0 does not hog the bandwidth of node 110 (due to its disproportionate weighting) when forwarding data on switch fabric 100. The modulation also ensures that the latency for forwarding data from the remaining q1-q4 queues is bounded by the slot threshold size. For example, a smaller slot threshold (e.g., 2) has a reduced transmission latency for lesser weighted queues as compared to a larger threshold (e.g., >2).

In one example, in order to implement the WRR algorithm, schedule manager 117 will mask off the queue with a large weight (q0) each time it crosses the selected slot threshold (2) and unmask the queue after the next queue in the round has been serviced. If multiple queues in the node 110 cross the slot threshold (e.g., are assigned a weighting greater than 2), then schedule manager 117 will mask and unmask each queue after one other queue is serviced and round robin among the queues that have crossed the slot threshold. Schedule manager 117 maintains a cumulative scheduling slot count for each queue that enters the distributed scheduling mode to ensure that the queue receives sufficient scheduling slots to match its weight and gets masked-off completely for a given round once it has consumed all its scheduling slots.

Figure 3:
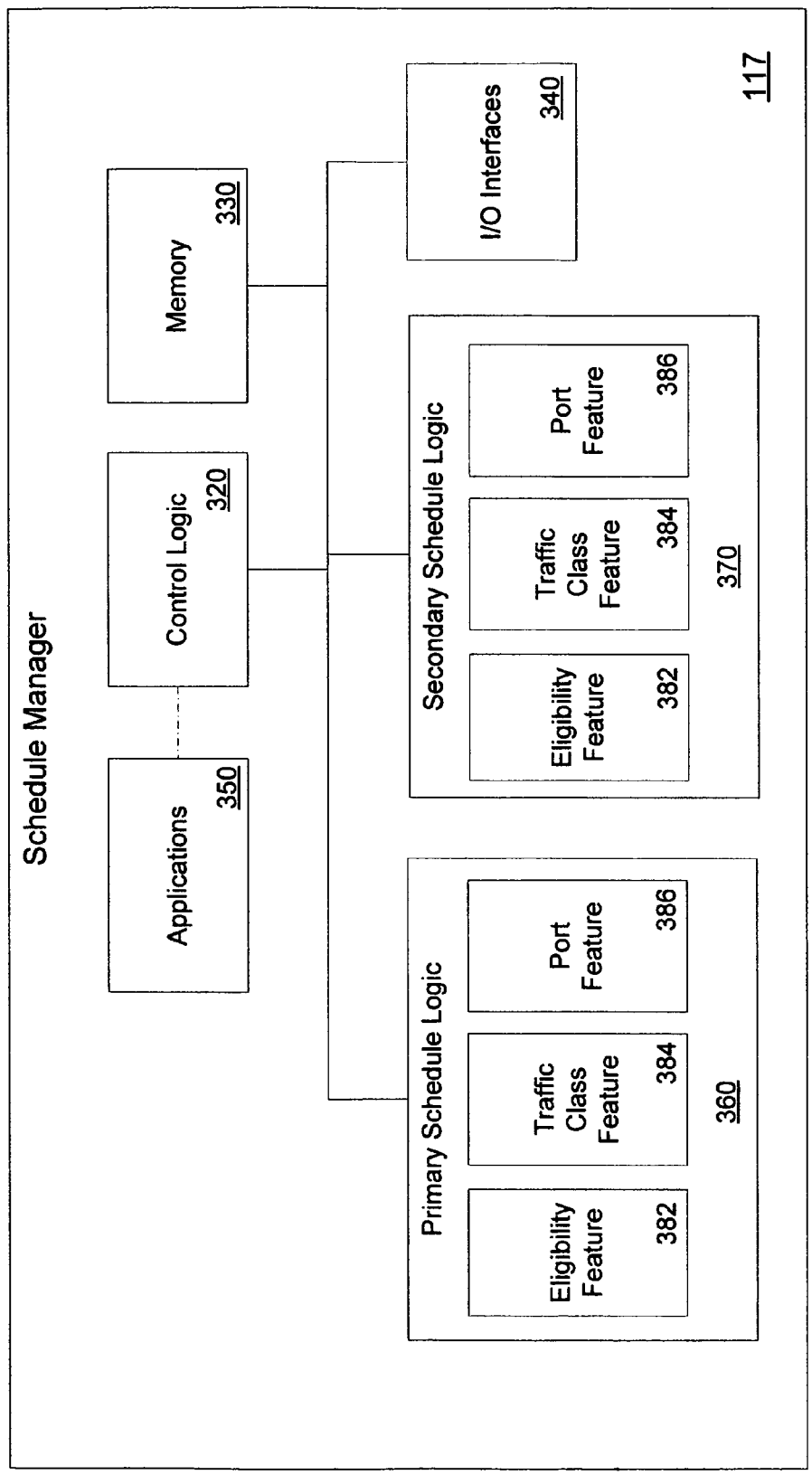
FIG. 3 is a block diagram of an example schedule manager architecture.

FIG. 3 is a block diagram of an example schedule manager 117 architecture. In FIG. 3, schedule manager 117 includes primary schedule logic 360, secondary schedule logic 370, control logic 320, memory 330, input/output (I/O) interfaces 340, and optionally one or more applications 350, each coupled as depicted. As will be described when describing an example node 110 in FIG. 4, schedule manager 117 includes both a primary and a secondary schedule logic to schedule the forwarding of data temporary stored in memory 114 that is separated into two portions. As described in more detail below, each portion includes queues associated with each of the ports in egress ports 115.

In one example, the elements portrayed in FIG. 3's block diagram may be node or electronic system resources allocated to support or enable schedule manager 117 as described in this disclosure. For example, primary schedule logic 360, control logic 320 and secondary schedule logic 370 each or collectively represent any of a wide variety of logic device(s) or executable content a node or an electronic system allocates to implement a schedule manager 117. These logic device(s) may include a microprocessor, network processor, microcontroller, FPGA, ASIC, or executable content to implement such control features, or any combination thereof.

In FIG. 3, both primary schedule logic 360 and secondary schedule logic 370 include eligibility feature 382, traffic class feature 384 and port feature 386. In one implementation, primary schedule logic 360 and secondary schedule logic 370 use these features to schedule the forwarding of data stored in one of a plurality of queues maintained or temporarily stored in a memory 114. The data, for example, associated with one or a plurality of traffic classes and to be forwarded through one of a plurality of ports in node 110 coupled to switch fabric 100. This scheduling to include the two stage arbitration scheme as described above for FIG. 2.

Control logic 320 may control the overall operation of schedule manager 117 and as mentioned above, may represent any of a wide variety of logic device(s) or executable content to implement the control of schedule manager 117. In alternate examples, the features and functionality of control logic 320 are implemented within primary schedule logic 360 and/or secondary schedule logic 370.

According to one example, memory 330 is used by primary schedule logic 360 or secondary logic 370 to temporarily store information. For example, information to determine which queues are eligible for service and which queues for each traffic class have been selected in the first arbitration scheme. Memory 330 also may include and/or stores executable content. The executable content may be used by control logic 320, primary schedule logic 360 or secondary schedule logic 370 to implement or activate features or elements of schedule manager 117.

I/O interfaces 340 may provide a communications interface via a communication medium or link between schedule manager 117 and a node or elements of an electronic system. As a result, I/O interfaces 340 enable primary schedule logic 360, control logic 320 or secondary schedule logic 370 to receive a series of instructions from software external to node 110 elements allocated to support schedule manager 117. The series of instructions may activate primary schedule logic 360, control logic 320 or secondary schedule logic 370 to implement one or more features of schedule manager 117.

In one example, schedule manager 117 includes one or more applications 350 to provide internal instructions to primary schedule logic 360, control logic 320 or secondary schedule logic 370. Such applications 350 may be activated to generate a user interface, e.g., a graphical user interface (GUI), to enable administrative features, and the like. For example, a GUI provides a user access to memory 330 to modify or update information to facilitate or implement the scheduling of data associated with one of a plurality of traffic classes and to be forwarded through one of the ports among egress ports 115.

In another example, applications 350 includes one or more application interfaces to enable external applications to provide instructions to primary schedule logic 360, control logic 320 or secondary schedule logic 370. One such external application could be a GUI as described above.

Figure 4:
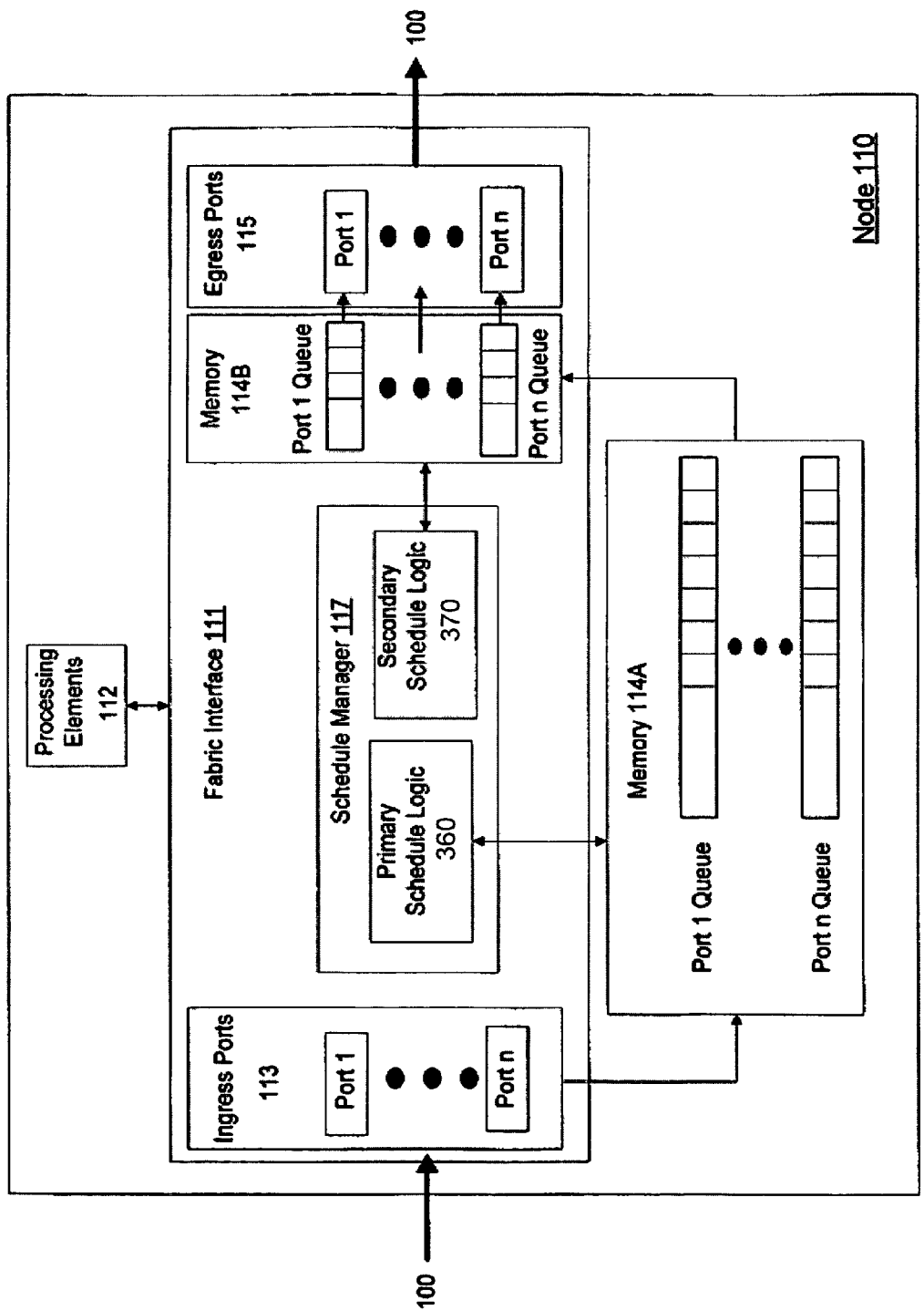
FIG. 4 is an illustration of the node on the switch fabric including primary and secondary schedule logic.

FIG. 4 is an illustration of node 110 including primary schedule logic 360 and secondary schedule logic 370 to schedule the forwarding of data temporarily stored in two portions of memory 114. In FIG. 4 the two portions of memory 114 are shown as memory 114A and memory 114B.

As mentioned above in FIG. 1, fabric interface 111 may be located within either a module or within a processing element among processing elements 112. In one example, the module or processing element has a limited amount of resources (e.g., resident memory, processing throughput, port bandwidth) to support resident queues. In addition, node 110 may receive data via ingress ports 113 and/or processing elements 112 may process the data at a rate that is greater than fabric interface 111 can forward the data through egress ports 115. As a result, memory 114 includes two portions of memory. In this example, the first portion of memory (memory 114A) is located outside of fabric interface 111 as shown in FIG. 4. This first portion of memory may include a plurality of queues associated with each egress port 115 that can store a large amount of data as compared to the plurality of queues in the second portion of memory (memory 114B) located inside of fabric interface 111 as shown in FIG. 4.

In another example, memory 114A and 114B are different types and/or sizes of memory and are both located within fabric interface 111. For example, memory 114A is a portion of memory 114 that has a large capacity and is a type of memory such as dynamic random access memory (DRAM). Memory 114B, in this example, is a portion of memory 114 with a small capacity as compared to memory 114A and is another type of memory such as static random access memory (SRAM). As a result, in this example, the queues in memory 114A associated with the ports in egress ports 115 each have a capacity that is larger than the capacity of the queues in memory 114B and may be a different type of memory.

In one implementation, primary schedule logic 360 schedules the forwarding of data associated with one of a plurality of traffic classes and temporarily stored in one of a plurality of queues in memory 114A. These queues in memory 114A are associated with the ports in egress ports 115. In one example, primary schedule logic 360 schedules the data to be forwarded to memory 114B. Primary schedule logic 360 schedules the forwarding of the data based on the two stage arbitration scheme described above. Also as mentioned above, each stage may include the use of a WRR, WFQ or RR arbitration algorithm.

Secondary logic 370 then schedules the forwarding of data that has been previously forwarded from memory 114A and temporarily stored in one of a plurality of queues in memory 114B. In one example, secondary schedule logic 370 schedules the data so that it may be forwarded through a port among egress ports 115 and on to switch fabric 100. Similar to primary schedule logic 360, secondary schedule logic 370 schedules the forwarding of the data based on the two stage arbitration scheme mentioned above. Each stage may also include the use of a WRR, WFQ or RR arbitration algorithm FIG. 5 is an example decision flow to select a queue from among the queues in memory 114 of node 110. In one implementation, switch fabric 100 and node 110 operate in compliance with industry standards and/or proprietary specifications. One industry standard implementation, the industry standard is the ASI standard. In this implementation, schedule manager 117 follows the decision flow depicted in FIG. 5 based on switch fabric 100 and node 110 operating in compliance with the ASI standard, although this disclosure is not limited to only switch fabrics operated in compliance with the ASI standard. In this implementation, the decision flow is also based on the example node 110 depicted in FIG. 4. As described above in FIG. 4, memory 114 includes a first portion in memory 114A and a second portion in memory 114B.

In one example, data associated with one of a plurality of traffic classes has been temporarily stored in one of a plurality of queues in memory 114A. This data may be destined for one or more other nodes coupled to switch fabric 100. Thus, the data is transmitted from one of the ports in egress ports 115. Egress ports 115 are coupled to the one or more other nodes via one or more communication links. For example, communication links 101, 103 or 105 coupled to nodes 120, 130 or 140 as depicted in FIG. 1.

In one example, the decision flow depicted in FIG. 5 is implemented first by primary schedule logic 360 for the data temporarily stored in memory 114A and then implemented by secondary schedule logic 370 for the data temporarily stored in memory 114B. Since both the primary and secondary schedule logics implement this decision flow, for purposes of explanation, primary schedule logic 360's decision flow will be primarily described.

In block 510, in one example, primary schedule logic 360 activates eligibility feature 382. Eligibility feature 382 queries the queues of memory 114A to determine which queues contain data. If a queue does not contain data, the queue is not eligible for service. In one example, eligibility for service is a way for schedule manager 117 to narrow down the possible choices when selecting a queue for scheduling. Thus, a queue that is not eligible for service is no longer considered further down the decision flow.

In one implementation, node 110 implements various flow control measure to include credit-based flow control (CBFC), status-based flow control (SBFC) and the use of token buckets (TBs) associated with queues. These flow control measures, for example, are described in the ASI standard.

In block 520, in one example, CBFC is described by the ASI standard as indicating whether a receiver of data transmitted from a port has sufficient buffer or queue capacity to receive data from another node or link partner on a switch fabric. For example, node 110 is a link partner with node 120 via communication link 101 as depicted in FIG. 1. These CBFC indications are exchanged, for example, at the time the link is established and at various other times described by the ASI standard. Eligibility feature 382 may obtain the CBFC indications for each port associated with each queue that contains data in memory 114B. Based on the CBFC indications, eligibility feature 382 determines whether the receiver has indicated sufficient credits to receive the data that is temporarily stored in each queue. If the CBFC for a given port associated with a given queue indicates insufficient credits, the given queue is not eligible for service.

In block 530, in one example, SBFC is described by the ASI standard as indicating whether a congestion condition exists at a port associated with a receiver of data. This congestion condition may be the result of the receiver node experiencing congestion conditions that could lead to its queue capacity being exceeded. For example, the receiver is experiencing throughput problems or upstream destinations may be throttling the flow of data received from the receiver. Thus to prevent the overflow of its queues, the receiver may indicate via an Xoff message that a congestion condition exists and not to forward data until an Xon message is received from the receiver to indicate the congestion condition no longer exists. Eligibility feature 382 may obtain the SBFC Xon or Xoff information for each port associated with each queue that contains data in memory 114A. If the SBFC information indicates Xoff, that queue is not eligible for service.

In block 540, in one example, TBs are described by the ASI standard as a way to limit packet flow rates so that a given port does not disproportionately use bandwidth as compared to other ports. TBs provide each queue associated with a given port a specified amount of tokens. As a queue forwards data, a given amount of tokens are subtracted from that token amount. Once the tokens are gone, the queue is not eligible for service until the tokens are replenished (e.g., after a given amount of time or after all queues have exhausted their tokens). Eligibility feature 382 may obtain the TB information for each eligible queue and determine whether the queue has sufficient tokens (e.g., at least one token) to forward the data. If the queue lacks sufficient tokens, the queue is not eligible for service.

In one example, as mentioned above, the queues in memory 114B have a small capacity as compared to the queues in memory 114A. Additionally, in an ASI operation environment, decision response times for selecting queues from memory 114B may result in the exclusion of a TB based flow control for these queues. Thus, in this example, secondary schedule logic 370 does not implement decision block 540 and does not base a queue's eligibility on whether the queue in memory 114B has sufficient tokens to forward the data.

In block 550, primary schedule logic 360 activates traffic class feature 384. Traffic class feature 384 initiates the first stage of the two stage arbitration scheme as described above. As part of the first stage, traffic class feature 384 may use a WRR, RR or WFQ arbitration algorithm to select a queue for each traffic class. For example, if node 110 is designed to forward data associated with four traffic classes, traffic class feature 384 selects eligible queues for each of the four traffic classes in memory 114A. Each selected queue associated with one of the ports among egress ports 115.

Once traffic class feature 384 selects a queue for each of the four traffic classes, primary schedule logic 360 activates port feature 386. Port feature 386, in one example, initiates the second stage of the two stage arbitration scheme. As part of the second stage, port feature 386 may use a WRR, RR or WFQ arbitration algorithm to select one queue associated with a given port in egress ports 115. The one queue to be selected from among the four queues associated with the four traffic classes selected by traffic class feature 384 in the first stage.

In block 560, in one example, the data in the selected queue associated with a given port is then scheduled to be forwarded. If primary schedule logic 360 is scheduling, the data in the selected queue is to be forwarded to another queue associated with the given port in memory 114B. If secondary schedule logic 370 is scheduling, the data in the selected queue is to be forwarded to the given port to be transmitted through that port. The process then returns to block 510 to begin another round of scheduling.

Referring again to FIG. 1 where switch fabric 100 is depicted as including nodes 110, 120, 130 and 140. In one example switch fabric 100 may be part of a modular platform system that operates in compliance with the ATCA standard. In this example, nodes 110, 120, 130 or 140 are boards and/or blades that operate in compliance with the ATCA standard and forward at least portions of data to other elements of switch fabric 100 over communication links 101, 103, 105, 107 or 109. At least a portion of these communication links may be routed through a backplane (not shown) for the modular platform system.

In one example, nodes 110, 120, 130 or 140 forward data over a switch fabric operating is in compliance with one or more communication protocols. These protocols may be associated with and/or described by sub-set specifications to the ATCA standard and are typically referred to as the "PICMG 3.x specifications." The PICMG 3.x specifications include, but are not limited to, Ethernet/Fibre Channel (PICMG 3.1), Infiniband (PICMG 3.2), StarFabric (PICMG 3.3), PCI-Express/Advanced Switching (PICMG 3.4), Advanced Fabric Interconnect/S-RapidIO (PICMG 3.5) and Packet Routing Switch (PICMG 3.6).

Referring again to memory 114 in FIG. 1 and 4 and memory 330 in FIG. 3. Memory 114 and/or memory 330 may include a wide variety of memory media including but not limited to volatile memory, non-volatile memory, flash, programmable variables or states, random access memory (RAM), read-only memory (ROM), flash, or other static or dynamic storage media.

In one example, machine-readable instructions can be provided to memory 114 and/or memory 330 from a form of machine-accessible medium. A machine-accessible medium may represent any mechanism that provides (i.e., stores and/ or transmits) information or content in a form readable by a machine (e.g., nodes 110, 120, 130, 140, processing elements 112 or schedule manager 117). For example, a machine-accessible medium includes: ROM, RAM, magnetic disk storage media, optical storage media, flash memory devices, electrical, optical, acoustical or other form of propagated signals (e.g., carrier waves, infrared signals, digital signals), and the like.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

References made in the specification to the term "responsive to" are not limited to responsiveness to only a particular feature and/or structure. A feature may also be "responsive to" another feature and/or structure and also be located within that feature and/or structure. Additionally, the term "responsive to" may also be synonymous with other terms such as "communicatively coupled to" or "operatively coupled to," although the term is not limited in his regard.

What is claimed is:

1. In a node to forward data on a switch fabric, a method comprising:
   scheduling with a schedule manager the forwarding of data associated with one of a plurality of traffic classes and to be transmitted through one of a plurality of ports coupled to the switch fabric, each port to be associated with a queue to store data to be forwarded from that port, wherein scheduling includes a two stage arbitration scheme that includes:
   a first stage to select one queue for each traffic class, then
   a second stage to select one queue from among the queues previously selected for each traffic class selected in the first stage,
   wherein the first stage and the second stage use an arbitration algorithm to select the one queue, the arbitration algorithm to include at least one of: a weighted fair queue algorithm, a weighted round robin algorithm, and a round robin algorithm,
   wherein the weighted fair queue algorithm is based, at least in part, on determining a next departure time and selecting a queue with the earliest departure time.

2. A method according to claim 1, wherein the first stage further comprises to select based, at least in part, on whether a queue is eligible for service.

3. A method according to claim 2, wherein eligibility for service includes at least one selected from the following group of: a queue has data, a receiver of the data transmitted through a port associated with the queue has indicated sufficient buffer capacity to receive the data, and no congestion condition indicated at the port associated with the queue.

4. A method according to claim 2, wherein the node operates in compliance with the Advanced Switching Interconnect standard.

5. A method according to claim 4, wherein eligibility for service includes at least one selected from the following group of: a queue has data, a credit based flow control indication from a receiver of the data transmitted through a port associated with the queue has indicated sufficient flow control credits to receive the data, and a status based flow control indication of Xon is indicated for the port associated with the queue.

6. A method according to claim 1, wherein the weighted round robin algorithm further includes:
   scheduling one or more slots to forward data from a first selected queue based on a weight assigned to the queue;
   scheduling one or more slots to forward data from a second selected queue based on another weight assigned to the second selected queue, the other weight assigned to the second selected queue lower than the weight assigned to the first selected queue; and
   modulating between one or more slots scheduled to the first selected queue and one or more slots scheduled to the second selected queue, the modulation based on a slot threshold.

7. A method according to claim 6, wherein the modulation based on the slot threshold further includes determining the slot threshold based on reducing a transmit latency for the second selected queue.

8. A method according to claim 1, wherein each port to be associated with a queue comprises each port to be associated with a queue that is located in a portion of a first memory and a queue that is located in a portion of a second memory, scheduling to further include:
implementing the two stage arbitration scheme for one or more queues located in the portion of the first memory, the two stage arbitration scheme to schedule the forwarding of the data associated with one of a plurality of traffic classes and to be transmitted through a given port, the data to be forwarded from the portion of the first memory to the portion of the second memory; and
implementing the two stage arbitration scheme for one or more queues located in the portion of the second memory, wherein the two stage arbitration scheme is implemented on data forwarded from the portion of the first memory.

9. An apparatus comprising:
a node to transmit data on a switch fabric; and
a schedule logic responsive to the node to schedule the forwarding of data associated with one of a plurality of traffic classes and to be transmitted through one of a plurality of ports coupled to the switch fabric, each port to be associated with a queue to store data to be forwarded from that port, wherein to schedule includes a two stage arbitration scheme that includes:
a first stage to select one queue for each traffic class, then
a second stage to select one queue from among the queues previously selected for each traffic class selected in the first stage,
wherein the first stage and the second stage use an arbitration algorithm to select the one queue, the arbitration algorithm to include at least one of: a weighted fair queue algorithm, a weighted round robin algorithm, and a round robin algorithm,
wherein the weighted fair queue algorithm is based, at least in part, on determining a next departure time and selecting a queue with the earliest departure time.

10. An apparatus according to claim 9, wherein the first stage further comprises to select based, at least in part, on whether a queue is eligible for service.

11. An apparatus according to claim 10, wherein the node operates in compliance with the Advanced Switching Interconnect standard.

12. An apparatus according to claim 11, wherein eligibility for service includes at least one selected from the following group of: a queue has data, a credit based flow control indication from a receiver of the data transmitted through a port associated with the queue has indicated sufficient flow control credits to receive the data, a status based flow control indication of Xon is indicated for the port associated with the queue, and a token bucket indication to indicate the queue has sufficient tokens to forward the data.

13. A system comprising:
a board to couple to a backplane, the board to include one or more processing elements; and
a fabric interface resident on the board and responsive to the one or more processing elements, the fabric interface to couple to a switch fabric and including logic to schedule the forwarding of data associated with one of a plurality of traffic classes and to be transmitted through one of a plurality of ports coupled to the switch fabric, each port to be associated with a queue to store data to be forwarded from that port, wherein to schedule includes a two stage arbitration scheme that includes:
a first stage to select one queue for each traffic class, then
a second stage to select one queue from among the queues previously selected for each traffic class selected in the first stage,
wherein the first stage and the second stage use an arbitration algorithm to select the one queue, the arbitration algorithm to include at least one of: a weighted fair queue algorithm, a weighted round robin algorithm, and a round robin algorithm,
wherein the weighted fair queue algorithm is based, at least in part, on determining a next departure time and selecting a queue with the earliest departure time.

14. A system according to claim 13, wherein the first stage further comprises to select based at least in part on whether a queue is eligible for service.

15. A system according to claim 14, wherein eligibility for service includes at least one selected from the following group of: a queue has data, a receiver of the data transmitted through a port associated with the queue has indicated sufficient buffer capacity to receive the data, and no congestion condition indicated at the port associated with the queue.

16. A system according to claim 14, wherein the fabric interface is to operate in compliance with the Advanced Switching Interconnect standard.

17. A system according to claim 16, wherein eligibility for service includes at least one selected from the following group of: a queue has data, a credit based flow control indication from a receiver of the data transmitted through a port associated with the queue has indicated sufficient flow control credits to receive the data, and a status based flow control indication of Xon is indicated for the port associated with the queue.

18. A system according to claim 13, wherein each port to be associated with a queue comprises each port to be associated with a queue that is located in a portion of a first memory and a queue that is located in a portion of a second memory, to schedule to further include the fabric interface logic to:
implement the two stage arbitration scheme for one or more queues located in the portion of the first memory, the two stage arbitration scheme to schedule the forwarding of the data associated with one of a plurality of traffic classes and to be transmitted through one of a given port, the data to be forwarded from the portion of the first memory to the portion of the second memory; and
implement the two stage arbitration scheme for one or more queues located in the portion of the second memory, wherein the two stage arbitration scheme is implemented on data forwarded from the portion of the first memory.

19. A system according to claim 13, wherein the board operates in compliance with the Advanced Telecommunications Computing Architecture standard.

20. A computer readable storage medium comprising executable instructions, which, when executed by a computer causes the computer to:
schedule the forwarding of data from a node, the data associated with one of a plurality of traffic classes and to be transmitted through one of a plurality of ports coupled to a switch fabric, each port to be associated with a queue to store data to be forwarded from that port, wherein to schedule includes a two stage arbitration scheme that includes:
a first stage to select one queue for each traffic class, then a second stage to select one queue from among the queues previously selected for each traffic class selected in the first stage, wherein the first and second stages use a weighted fair queue arbitration algorithm to select the one queue, the weighted fair queue arbitration algorithm based, at least in part, on determining a next departure time and selecting a queue with the earliest departure time.

21. A computer readable storage medium according to claim 20, wherein the first stage further comprises to select based, at least in part, on whether a queue is eligible for service.

22. A computer readable storage medium according to claim 21, wherein eligibility for service includes at least one selected from the following group of: a queue has data, a receiver of the data transmitted through a port associated with the queue has indicated sufficient buffer capacity to receive the data, and no congestion condition indicated at the port associated with the queue.

23. A computer readable storage medium comprising executable instructions, which, when executed by a computer causes the computer to:

schedule the forwarding of data from a node, the data associated with one of a plurality of traffic classes and to be transmitted through one of a plurality of ports coupled to a switch fabric, each port to be associated with a queue to store data to be forwarded from that port, wherein to schedule includes a two stage arbitration scheme that includes:

a first stage to select one queue for each traffic class, then a second stage to select one queue from among the queues previously selected for each traffic class selected in the first stage, wherein the first and second stages use a weighted round robin arbitration algorithm to select the one queue, wherein the weighted round robin arbitration algorithm includes:

scheduling one or more slots to forward data from a first selected queue based on a weight assigned to the queue;

scheduling one or more slots to forward data from a second selected queue based on another weight assigned to the second selected queue, the other weight assigned to the second selected queue lower than the weight assigned to the first selected queue; and modulating between one or more slots scheduled to the first selected queue and one or more slots scheduled to the second selected queue, the modulation based on a slot threshold.

* * * * *